July 2, 1935.  T. J. SMULSKI  2,006,608

LIQUID LEVEL INDICATOR

Filed Oct. 4, 1930

Inventor
Theodore J. Smulski
By Slough & Canfield
Attorneys

Patented July 2, 1935

2,006,608

UNITED STATES PATENT OFFICE 2,006,608

LIQUID LEVEL INDICATOR

Theodore J. Smulski, Gary, Ind., assignor to The Anderson Company, Gary, Ind., a corporation of Indiana Application October 4, 1930, Serial No. 486,416

10 Claims. (Cl. 177—351)

My invention relates to liquid level indicating apparatus, and relates more particularly to the provision of improved actuating apparatus disposed adjacent the liquid whose level it is desired to remotely indicate, for controlling the actuation of a remotely disposed liquid level indicator for the system.

The apparatus of my present invention is one adapted for inclusion in an electrical system comprising besides said apparatus, a suitable source of electrical current, a suitable electro-responsive indicator or recorder mechanism, and electro-circuit conductors interconnecting said source, said apparatus, and said mechanism whereby said apparatus under the control of an element responsive to changes in liquid level may commensurably effect variations in the flow of current from the said source to said mechanism whereby the mechanism may at all times be actuated substantially according to the level of liquid.

The electro-responsive mechanism may be substantially of the nature of that disclosed in my co-pending application for United States Letters Patent, Serial No. 458,595, filed May 31, 1930, Patent No. 1,885,052 dated October 25, 1932, or any equivalent mechanism variably responsive according to the principles thereof may be employed in connection with the apparatus of the present invention.

An object of my present invention is to provide an improved controller for a relatively remotely disposed electro-responsive mechanism for showing the level of liquid at the controller.

Another object of my invention is to provide a controller of the above described general character which will be efficient in operation though susceptible to being manufactured in quantities at low cost.

Another object of my invention is to provide an improved controller of the above described general character wherein the operative parts may be readily adjusted for interchangeable use in connection with an electro-responsive mechanism of the system having a given predetermined responsiveness.

Another object of my invention is to provide an improved apparatus of the above described general character which is particularly adapted for use in connection with a liquid container for automotive vehicles.

Another object of my invention is to provide an improved apparatus of the above described general character which is particularly adapted for use in connection with a liquid fuel tank of an automotive vehicle.

Other objects of my invention and the invention itself will be readily apparent from the following description of an embodiment thereof wherein reference is had to the accompanying drawing illustrating the said embodiment.

Referring to the drawing:—

Figure 1:
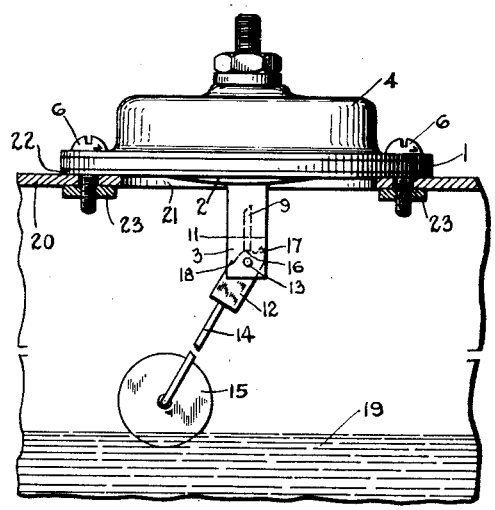
Fig. 1 is a view in side elevation of a unitary actuating mechanism embodying the principles of my invention.
Figure 2:
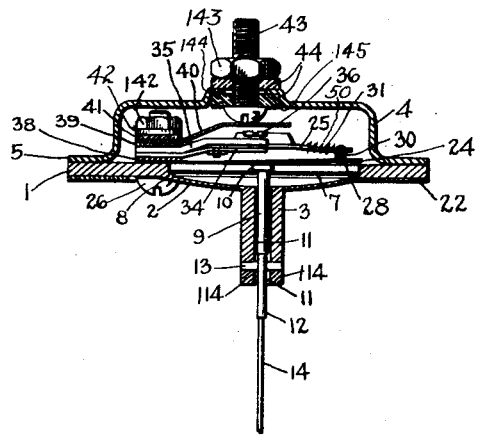
Fig. 2 is a longitudinal medial section of the apparatus shown in Fig. 1.

Referring now to all of the figures of drawing, in all of which like parts are designated by like reference characters, at 1 is shown a supporting frame for the apparatus, in the form of a disk having a preferably centrally dished portion 2 supporting a centrally disposed tubular element 3, the bore of which extends through the central portion of the disk, said tubular element extending pendantly from the convex side of the disk.

The disk 1 together with an inverted cup-shaped cover cap 4, secured by a peripherally disposed rim flange 5 to the upper surface of the planular disk border, provides a casing for the operating parts of the electrical controlling mechanism for the actuator apparatus.

A thin sheet metal diaphragm 7 is seated on a shoulder 8 bordering the central dished portion of the disk and the edge of the diaphragm is soldered all around to the disk.

A rod 9 is secured to the central portion of the diaphragm, being projected downwardly through a central aperture first provided therein until its head 10 engages the diaphragm upper surface bordering the aperture, whereupon the said head is soldered by its peripheral portion to the said diaphragm to close the aperture in a leak-proof manner. The rod 9 is loosely projected into the bore of the tube 3 and is reciprocable therein.

The diaphragm 7 is preferably made quite thin and is readily yieldable to longitudinal thrusts exerted by the rod 9 thereon and susceptible to restoration when the pressure of said thrusts is withdrawn. Although the diaphragm may be made from any of a number of yieldable materials, I preferably make it of metal, such as what is commonly known as shim stock of one or two thousandths of an inch thickness, and I may make it more yieldable by providing a plurality of concentric annular folds surrounding its central portion.

The tube 3 is diametrically slotted at its lower end to a depth such as indicated at 11, the free end of the reciprocable rod 9 projecting into the slot thereby provided.

An eccentric cam element 12 is pivotally supported on a pin 13 extending into the pendant arms 114 provided by the slotting of the tube 3, said cam element having a pendant rod 14 secured rigidly to its lower end extending longitudinally therefrom and carrying a cork or like float 15 at its free end, which is secured thereto.

The cam element 12 is provided with an eccentric cam surface 16 near its upper end and disposed laterally of the longitudinal axis of said element 12, said rod 14 and said float 15, there being provided a pair of shoulders 17 and 18, integrally formed on said element 12, to form stops to limit the oscillatory movement of said element and rod on the pin 13.

The surface of the cam 16 is so formed that when the float 15 is in its lowermost position with the rod 9 in engagement with the stop shoulder 17, the rod 9 will have descended into the tube 3 to a maximum amount, and as the float 15 is lifted by an increase in the level of the liquid shown at 19 upon which it floats, the cam element 12 will rotate to thrust the rod 9 upwardly to an amount proportional to the amount of increase of liquid level.

When the tank whose upper wall is indicated at 20 is substantially full of liquid 19, the float 15 will be so elevated as to rotate the cam element 12 to effect engagement thereof by the stop shoulder 18, with the rod 9.

To accommodate the placement of the actuator apparatus described on a liquid fuel tank, the top wall of the tank may be provided with an aperture 21 and the apparatus mounted on the wall 20 with its dished central portion 2 and pendant float supporting tube 3 projected into and through said aperture.

A cork or like sealing gasket 22 of annular form being interposed between the lower planular border surface of the disk plate 1, the apparatus is secured onto the tank by projecting the screws 6 through the superposed tank top wall 20, the gasket 22, the plate 1, and the cover flange 5, and may be screw threaded directly into interiorly threaded apertures in the wall 20, receiving said screws, or nuts 23 may be affixed to their interiorly projecting ends.

In Figure 1, the interiorly disposed portions of the cam element 12 and the reciprocable rod 9 are indicated by dotted lines.

Interiorly of the casing is provided electrical controlling means responsive to the variable longitudinal positions assumed by the rod 9 incidental to varying levels of liquid in the tank. Said controlling means includes an actuating spring 24 and a bi-metallic strip 25 electrically insulated from each other at their fixed ends whereby they are mounted on the relatively thick planular portion of the disk 1 by screws 26, in superposed relation. The spring 24 is directly supported on the disk 1, in engagement therewith by a pair of transversely extending arm portions of the spring provided with apertures 27, through which the screws 26 are projected, the intermediate arm of the T-shaped spring 24 thereby formed supporting an electrical contact element 28 near its free end projecting from its upper side.

The bi-metallic strip 25 is provided with an intermediate yoke portion having a laterally turned edge 29 to stiffen it against flexure in the longitudinal direction, and a pair of thermally warpable arms 31 and 32 extending from the two ends of the yoke, divergingly, the arm 31 being preferably much narrower and supporting a contact 30 at its free end, and the arm 32 being secured by rivets 33 to an intermediate portion of a relatively heavy leaf spring 34 of substantially L-form, the fixed arm of which being provided with apertures 37 which are larger than the apertures 27 for the spring 24, the free arm being apertured at 33' to receive the rivets 33.

A heavy substantially L-shaped sheet metal element 35 formed like the more resilient element 34 and with apertures correspondent to those shown at 37 for the spring 34 supports at its free end an adjusting screw 36 screw threaded through an aperture thereof. Insulating washers 38 and 39 being provided, with tubular insulating bushings projected through the apertures 37 of the spring 34, and the corresponding apertures of the element 35, the spring 24 and the screws 26 are electrically insulated from the element 35, and spring 34, both of which are superposed in direct engagement.

Figure 5:
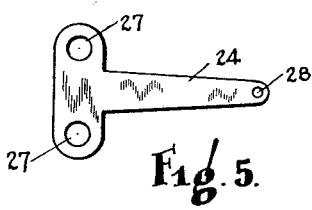
Figs. 5 and 6 are plan views of a pair of spring elements for said apparatus.
Figure 6:
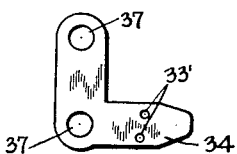

A contact connector spring 40, of T-form having apertures like the spring 24, Fig. 5, for the reception of the screws 26, but enlarged to receive tubular insulating bushings to insulate the cross-arm of the spring from the screws is also secured thereby in superposed relation to the spring 24, the spring 34, the element 35, and is insulated from them by apertured insulating washers 41. The screws 26 are provided with washers 42 and nuts 142.

The superposed sheet metal elements above described have their free ends in spaced relation whereby all contact with the bi-metal strip arm 31 and the spring 24 is limited to such engagement as there may be between the electrical contact elements respectively carried thereby.

The arm 31 of the bi-metallic strip is provided with a non-inductively wound electrical resistance conductor 50, wrapped thereon, through which an electrical current may be passed, to communicate heat to the strip arm 31 to effect thermostatic warping thereof and to move its free end with the carried contact 30.

Figure 3:
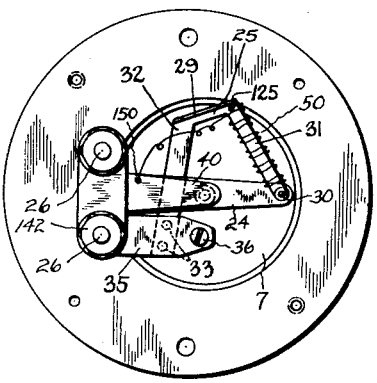
Fig. 3 is a plan view of the apparatus of the foregoing figures excepting the cover which is assumed to have been removed in this figure to disclose the interiorly disposed parts, in plan.
Figure 4:
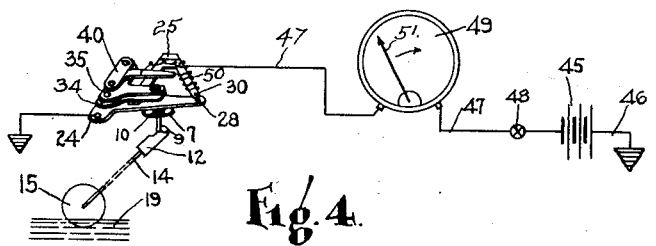
Fig. 4 illustrates diagrammatically an electrical system wherein the apparatus of the foregoing figures may be advantageously incorporated.

Referring to the diagrammatic view Fig. 4, at 45 an electrical source of current is indicated which may be the electrical storage battery of an automotive vehicle. To the metal frame of the vehicle one pole of the battery is permanently connected, or "grounded" as at 46. An electrical circuit conductor 47 is provided to interconnect the source of current 45, an electrical switch 48, a preferably thermally responsive indicator 49, the electrical heating element 50 and the contacts 30 and 28, in serial circuit. The circuit through the heating element 50 is preferably from the conductor 47 to the screw 43 and thence to spring 40 to which, as at 150, Fig. 3, one end of the heating winding 50 is secured. The other end of the winding 50 is secured to the element 25 as at 125 and the circuit from that point is by way of the elements 25, 34, 24 and 1 and thence to ground or the frame of the vehicle.

The electrical contacts 28—30 when in engagement close the electrical circuit traced above, and current flowing over this circuit, which involves an electrical heating element for the indicator 49, simultaneously effects heating of the thermostatic elements of the controller and indicator, that for the controller being the bi-metallic strip arm 31.

Heating of the strip arm 31 will in accordance with well known principles effect a warping of the arm, to move its free contact supporting end upwardly, this being accomplished at the end of an interval of time, whereupon the contact at 28—30 is broken, which in turn effects discontinuance of electrical current flow and therefore of heating communicated by the electrical heating elements to their associated thermostatic elements.

The contacts 28—30 will be substantially separated since even after discontinuance of current flow the flow of heat to portions of the strip arm 31 from the winding 50 and associated parts will continue for a brief period of time.

Following discontinuance of the communication of heat to the bi-metallic arm 31, it will gradually cool until the contacts 28—30 are reclosed and the operation above described following closure of the contacts, will be repeated periodically, so long as the switch 48, which may also function as an ignition switch for the automotive vehicle, is closed.

Since upward movements of the float 15, responsive to increases of the amount of liquid 19 in the tank, effect upward movements of the contact 28, the contact 30 being required to be lifted more in order to break the circuit with the contact 28, it follows that the strip 31 comprising the thermostatic element accomplishing upward movement of the contact 30 must be heated to a greater degree when the float is relatively elevated upon a full tank condition, or approaching it, than when the liquid supply in the tank is relatively depleted.

The temperature of the arm 31 is controllable by the period of heating, and therefore a longer period of heating will be required to warp the arm 31 sufficiently to break the contacts upon a relatively full tank condition, and upon such conditions the intervening non-heating periods will be shorter. If the voltage of the source 45 is increased the predetermined temperature of the strip 31 required to break the contacts will be more quickly achieved, but otherwise in all cases the apparatus will function to provide the strip with the required amount of heat to periodically break the contacts, for all positions of the float, but commensurably or in variable correspondence therewith.

The indicator 49 may be constructed in many different ways and I have disclosed indicator constructions in my copending applications, Serial No. 147,076, filed November 8, 1926, Pat. No. 1,885,051, dated October 25, 1932, and Serial No. 458,595, filed May 31, 1930, Pat. No. 1,885,052, dated October 25, 1932, which are suitable.

As described in the latter copending application, the indicator comprises a substantially U-shaped bi-metallic strip somewhat similar to that shown at 25, on an arm of which the electrical heating element is disposed, to communicate heat thereto whenever current flows over the above described electrical circuit responsive to the closure of the contacts 28—30, periodically as related above. The other arm is provided to compensate the indicator operating free end of the electrical heated arm for all changes in ambient temperatures.

In like manner the wider arm 32 of the strip 25 herein compensates the arm 31 of the controller thermostatic element for changes in ambient temperatures, whereby the carried contact 30 will be held immovable regardless of such ambient temperature changes.

Reference may be had to my above said copending applications for a fuller description of the operation of the indicator 49 by electrical currents flowing over the electrical circuit above described, under the control of controller electrical contacts such as 28—30, under the various conditions of control to which an element of said controller is subjected; in the present case varying conditions of control are effected by movements of the rod 9 responsive to movements of the float 15, to lift the contact 28 or lower it.

The diaphragm 7 is readily yieldable in its mid portion to thrusts of the rod 9 in both directions, meanwhile preventing any flow or leakage of liquid through the centrally apertured supporting plate 1. A ready adjustment of the contact 30 relative to the contact 28 is had by turning the screw 36, screw threaded through the supporting plate 35 which is superposed over the spring 34 which carried the bi-metallic U-shaped strip 25, since the arm 31 thereof which carries the contact 30 is moved upwardly or downwardly according to upward or downward movements of the free end of said spring 34, engaged by the end of the screw 36.

The apparatus above described operates as follows: Assuming that the float 15 carried on the end of the arm 14 takes a given position, as shown, causing the arm 14 to take a definite position of angularity relative to the rod 9, the rod 9 will be longitudinally moved to a position as shown wherein the contacts 28—30 are initially closed to complete the electrical circuit including the source of current 45, which may be an automobile storage battery, the closed contacts of the ignition switch 48 of the car, the circuit conductor 47 in which the indicator 49 is serially included, and the serially connected electrical heating winding 50 and contacts 28—30.

The circuit being completed as described, the heating element 50 will heat the bi-metallic strip arm 31 and cause it to warp according to the amount of the heating necessary to break the contacts 28—30, whereupon the heating of the arm 31 will be discontinued as will also energization of the indicator 49, which preferably employs an electrically heated thermostat having the property of storing heat for substantial periods.

The energization of the heating winding 50 being discontinued, heat will momentarily continue to flow from the wire 50, which is at a somewhat higher temperature than the bi-metallic strip arm 31, to ensure that the contact at 28—30 is definitely and positively broken, following which, the energization of the heating winding being discontinued, its temperature will be rapidly reduced below that of the temperature of the strip 31, which will gradually lose heat until the contacts 28—30 are reclosed.

Following this initial cycle of operations of the contacts from a closure to an opening, and then a reclosure, this cycle will be periodically repeated, so long as the ignition switch 48 controlling the electrical circuit is closed, and the indicator 49 will receive and be heated by successive pulses of current flowing through it corresponding in length and frequency to the periodicity of the closing and opening of the contacts 28—30. The indicator 49 preferably employs an electrically heated thermally responsive thermostatic element having preferably thermal capacity, by which it achieves a given temperature in a given length of time for a given amount of heat energy supplied thereto and may lose heat at a predetermined slow rate when the supply of energy is discontinued.

The indicator needle 51 will be moved in the direction of the arrow, shown on the face of the indicator 49 to a distance determined by the rate at which heat energy is accumulated therein which corresponds to the total time that the contact is closed at 28—30.

Should the level of liquid 19 in the tank be raised or lowered, the cam surface 16 of the element 12 will effect such a changed longitudinal adjustment of the rod 9 that the contact 28 will be adjustably moved towards or away from the contact 30 and in such case, the temperature of the bi-metallic arm 31 required to effect the periodic breaking and making of the contacts will increase or decrease according to whether the float 15 is raised or lowered and consequently to achieve such increased or decreased temperature, the ratio of the average length of the periods of closure to the periods of opening of the contacts will be increased or decreased, and the heat supplied to the indicator 49 will be correspondingly increased or decreased to correspondingly vary the level indicating position of the needle 51.

Having thus described one embodiment of my invention, I am aware that numerous and extensive departures may be made from the embodiment herein illustrated and described but without departing from the spirit of my invention.

I claim:

1. In an electric controller, a supporting frame, a pair of movable contact carrying elements disposed with their contacts engageable and supported by the frame, one element adapted to be variably mechanically moved to shift the position of its contact, the other element being thermostatic and adapted when heated to freely move its contact out of said contact engagement, an electric heater for the thermostatic element energizable by current through the contacts when engaged, the thermostatic element being formed from U-shape planar bi-metal, the heater and the contact of the thermostatic element being associated with a free leg of the U, and the other leg of the U having a portion secured to the frame in a manner to permit adjusting movement thereof in directions at right angles to the plane of the bi-metal, means for so adjustably moving it, to adjustably vary the relative positions of the two contacts, the said legs of the U being disposed so as to bend concurrently in like directions in response to changes of ambient temperature to maintain the contact of the thermostatic element in substantially constant position relative to the associated contact.

2. In an electric controller, a supporting frame, a pair of movable contact carrying elements disposed with their contacts engageable and supported by said frame, one element adapted to be variably mechanically moved to shift the position of its contact, the other element being thermostatic and adapted when heated to freely move its contact out of said contact engagement, an electric heater for the thermostatic element energizable by current through the contact when energized, the thermostatic element being formed from U-shaped bi-metal, the heater and the contact of the thermostatic element being associated with a free leg of the U, and the other leg of the U having a portion remote from the closed end of the U secured to a flexible element which in turn is secured to the frame, means for adjustably moving the flexible element to bodily adjustably move the thermostatic element to adjustably vary the relative position of the two contacts, the said legs of the U being disposed so as to bend concurrently in like directions in response to changes of ambient temperature to maintain the contact of the thermostatic element in substantially constant position relative to the associated contact.

3. In combination with a tank for liquid, an electric controller, comprising a casing adapted for mounting on an apertured wall of the tank, a flexible sealing wall element on the casing adapted to prevent egress of liquid from the tank through the aperture of said tank wall into said casing, means pendantly supported by the casing within the tank engageable with said flexible wall element, means responsive to the amount of liquid in the tank for actuating said first named means to exert a thrust effort on said flexible wall commensurable with the amount of liquid in the tank, and electrical controlling means disposed within the casing adapted to periodically transmit current impulses, the cumulative current value of said impulses for a given interval being commensurable to the position of the wall element.

4. In combination with a liquid container, a float in the container, an electrical controller mounted on a wall of the container, said controller comprising a diaphragm, a resilient arm rigidly supported at one end and substantially spanning the diaphragm and carrying a first contact at its free end, means associated with the said float adapted to move a free portion of said diaphragm and means to communicate movement of said diaphragm free portion to an intermediate portion of the arm to move its associated contact, a second resilient arm rigidly supported at one end and at its free end supporting one end of a bimetallic thermostatic element, a second contact carried by the free end of the bimetallic element and engageable with the first contact, a screw-threaded means engaging the second resilient arm for bending it to adjust the position of the thermostat supported contact relative to the first contact, whereby when the float in the container is moved in a given direction responsive to a change of the amount of liquid in the container, the first contact may be moved to engage the second contact and close the circuit, the thermostat being adapted when heated to effect reopening of said contacts independently of the movement of said diaphragm, an electrical heating element adapted when energized to communicate heat to said thermostat, a source of electrical current, said contacts adapted when closed to communicate current from said source to said electrical heating element.

5. In an electric controller, a resilient element rigidly supported at one end, and carrying a first contact at its free end, a second resilient element rigidly supported at one end and at its free end rigidly supporting one end of a thermostatic bimetallic element, a second contact supported on the free end of the bimetallic element, an electric heating winding for the thermostatic element having a circuit closable by the contacts, and means to adjustably bend the second resilient element to adjust the position of the second contact relative to the first contact, and means to engage the first resilient element at an intermediate portion thereof and to variably bend it.

6. An electric controller as described in claim 5 and in which the thermostatic element is generally of U-shape, is supported by one leg, carries the contact on the other leg, and both legs thereof are thermally bendable in the same direction.

7. In combination with a liquid container, a float in the container, an electrical controller mounted on a wall of the container, the controller comprising a diaphragm, an arm hingingly supported at one end and spanning a portion of the diaphragm and carrying a first contact at its free end, means associated with the said float adapted to move a free portion of said diaphragm, means to communicate movement of said diaphragm free portion to an intermediate portion of the said arm to move its associated contact, a second arm hingingly supported at one end and at its free end supporting one end of a bimetallic thermostatic element, a second contact carried by the free end of the bimetallic element and engageable with the first contact, means engaging the second arm for hingingly moving it to adjust the position of the thermostat supported contact relative to the first contact, whereby when the float in the container is moved in a given direction responsive to a change of amount of liquid in the container, the first contact may be moved to engage the second contact and close the circuit, the thermostat being adapted when heated to effect opening of said contacts independently of the movement of said diaphragm, an electrical heating element adapted when energized to communicate heat to the thermostat, a source of electrical current, said contacts adapted when closed to communicate current from said source to said electrical heating element.

8. In an electric controller, an element hingingly supported at one end and carrying a first contact at its free end, a second element hingingly supported at one end and at its free end supporting one end of a thermostatic bimetallic element, a second contact supported at the free end of the bimetallic element, an electric heating winding for the thermostatic element having a circuit closable by the contacts and means to adjustably hingingly move the second said element to adjust the position of the second contact relative to the first contact, and means to engage the first said element at an intermediate portion thereof and to variably hingingly move it.

9. An electric controller as described in claim 8 and in which the thermostatic element is generally of U-shape, supported by one leg, and carries its contact on the other leg and both legs thereof are thermally bendable in the same direction.

10. In an electric controller, a pair of movable contact bearing elements disposed with their contacts engageable, one of the elements being adapted to be variably mechanically moved to shift the position of its contact, the other element being thermostatic and generally of U-shape and having a contact associated with a freely movable one of the U arms whereby said arm when heated is freely movable out of contact engagement, an electric heater for the said arm energizable by current through the contacts when engaged, and both arms being thermally responsive in like directions to correct for changes of ambient temperatures tending to move the thermostat associated contact.

THEODORE J. SMULSKI.